United States Patent Office 3,488,650
Patented Jan. 6, 1970

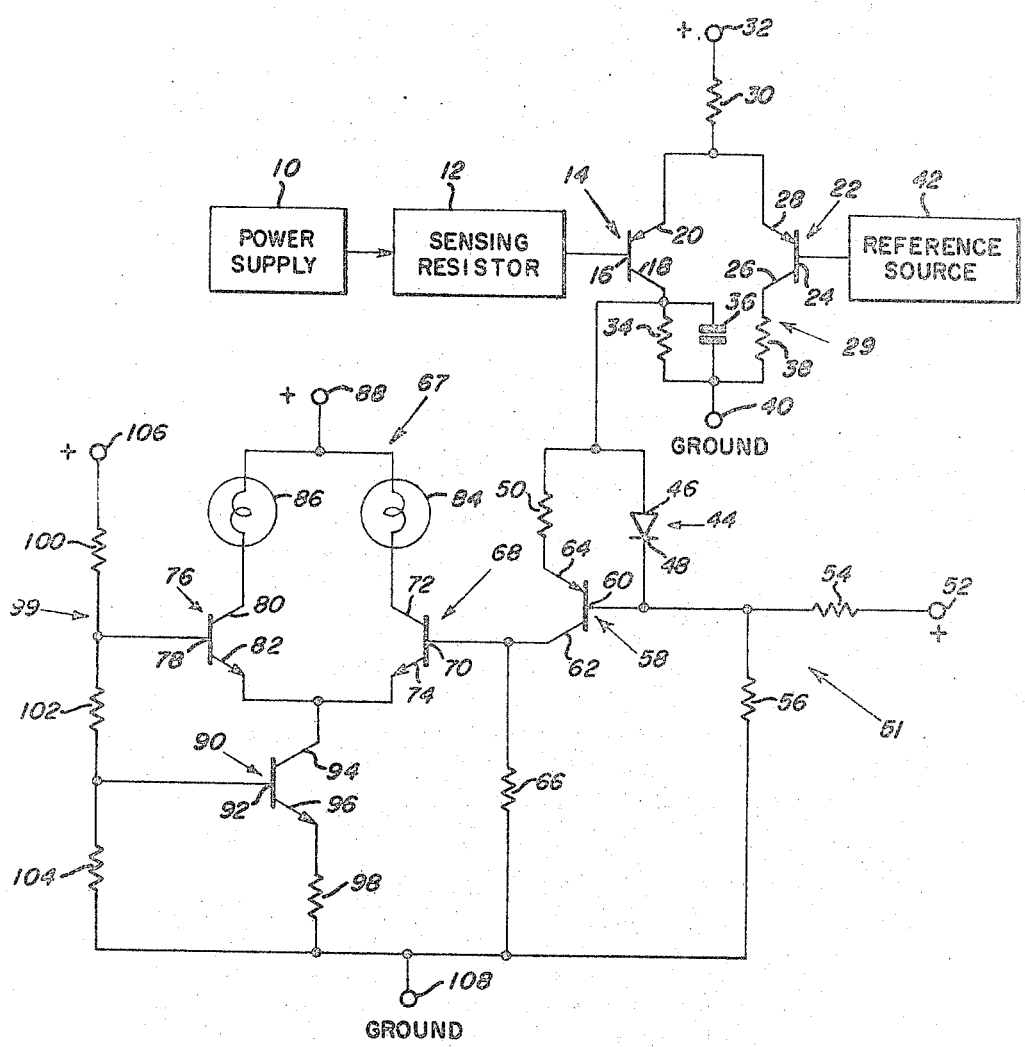

3,488,650
POWER SUPPLY MODE INDICATOR CIRCUIT
Paul Muchnick, Norwalk, Conn., assignor to Raytheon Company, Lexington, Mass., a corporation of Delaware
Filed May 12, 1966, Ser. No. 549,504
Int. Cl. G08b 21/00
U.S. Cl. 340—248     11 Claims

ABSTRACT OF THE DISCLOSURE

A current/voltage mode indicator circuit for electronic power supplies comprising a diode, a first transistor connected to a voltage mode indicator lamp, and a second transistor connected to a current mode indicator lamp. The diode is back-biased during the voltage mode, the first transistor conducts heavily and the voltage mode indicator lamp is lighted. The diode becomes forward-biased when the power supply operates in the current mode, the second transistor conducts heavily and the current mode indicator lamp is lighted. The invention does not require the use of relays as do prior circuits.

---

This invention is concerned with electronic power supplies and, more particularly, with means for indicating when the power supply is operating in a particular mode.

Many electronic power supplies known in the art operate in both the current and voltage modes. At light loads, the power supply operates in the voltage mode in order to maintain a constant voltage output independently of line or load changes. As the load is increased, however, a preset point will be reached where the current mode amplifier's output signal overrides the signal from the voltage mode amplifier. When the load increases from this point on, the power supply operates in the current mode and acts as a constant current supply.

It is sometimes advantageous to know the mode in which the power supply is operating since entering the current mode may have been caused by an undesirable overload or load failure. Prior art systems have approached this problem by sensing the actuation of the current mode amplifier and then operating relays, but they have the usual problem of hysteresis associated with the pull-in and drop-out voltage difference of relays.

In accordance with the present invention, a first differential amplifier comprises a first transistor having a voltage divider connected to its base and a voltage mode indicating lamp connected to its collector, and a second transistor having a third transistor connected to its base and a current mode indicating lamp connected to its collector. A diode has its anode connected to a second differential amplifier and cathode connected to both a voltage divider and the third transistor. During the voltage mode, the second differential amplifier senses that the power supply is not operating in the current mode and back-biases the diode rendering the third transistor cut-off. This prevents the second transistor from conducting and the current mode lamp fails to light. However, the connected voltage divider causes the first transistor to conduct heavily and the voltage mode lamp lights.

As the load on the power supply increases, the second differential amplifier senses the current output signal and decreases the back-biasing of the diode. However, no noticeable change in the action of the first differential amplifier occurs until the second differential amplifier has forward-biased the diode. The initiation of this forward-biasing is selected to occur at or substantially close to the crossover point at which the current output overrides the voltage output. The third transistor conducts causing the second transistor to conduct heavily and to light the current mode lamp. Accordingly, this invention does not have the hysteresis problem of the prior art and is less expensive to build and incorporate into other equipment.

Other objects, features and embodiments of the invention will be apparent from the following description of a preferred embodiment and reference to the accompanying drawing, wherein:

The figure is a diagrammatic representation of a power supply connected to the inventive mode indicator circuit.

The inventive mode indicator circuit is shown in the figure as being connected to dual mode power supply 10 and includes a sensing resistor 12 responsive to the current output signal from power supply 10 connected to base 16 of transistor 14 of differential amplifier 29. Reference voltage source 42 is connected to base 24 of transistor 22 for providing a signal for comparison with the output signal of sensing resistor 12. Emitter 20 of transistor 14 and emitter 28 of transistor 22 are commonly connected to resistor 30 which is further connected to voltage source 32. Resistor 34 is connected in parallel to capacitor 36 which is utilized for loop stabilization, between collector 18 of transistor 14 and voltage source 40; and, resistor 38 is connected between collector 26 of transistor 22 and voltage source 40. Anode 46 of diode 44 is connected in common to collector 18 of transistor 14 and resistor 50; cathode 48 of diode 44 is connected in common to voltage divider 51 and base 60 of transistor 58. Voltage divider 51 comprises resistors 54 and 56 connected in series between voltage source 52 and voltage source 108. Resistor 50 is also connected to emitter 64 of transistor 58. Collector 62 of transistor 58 is commonly connected to base 70 of transistor 68 and resistor 66 which is further connected to voltage source 108. Differential amplifier 67 comprises transistors 68 and 76. Emitter 74 of transistor 68 and emitter 82 of transistor 76 are connected in common to collector 94 of constant current transistor 90. Current mode indicating lamp 84 is connected between voltage source 88 and collector 72 of transistor 68, whereas voltage mode indicating lamp 86 is connected between collector 80 of transistor 76 and voltage source 88. Voltage divider 99 comprises resistors 100, 102, and 104 connected in series between voltage sources 106 and 108. Resistor 98 is connected between emitter 96 of transistor 90 and voltage source 108. Resistors 102 and 104 are connected in common to base 92 of transistor 90, while resistors 100 and 102 are connected in common to base 78 of transistor 76. Power supply 10 may comprise any one of the commercially available dual mode supplies such as the Raytheon QRC40-4.

The mode indicator circuit depicted in the drawing operates in the following manner. While power supply 10 is operating in the voltage mode as a constant-voltage supply at no load, sensing resistor 12 senses that no current is being generated by power supply 10 and hence does not apply a voltage signal to base 16 of transistor 14. Consequently, transistor 22 of differential amplifier 29 is caused to conduct by reference voltage source 42, whereas transistor 14 is held nonconductive so that anode 46 of diode 44 is connected through resistor 34 to ground source 40. Voltage divider 51 is connected between positive voltage source 52 and ground source 108, and applies a positive voltage signal to cathode 48 of diode 44. Accordingly, diode 44 is maintained in a back-biased condition and does not conduct. Since diode 44 is not conducting, transistor 58 cannot conduct and apply a signal to base 70 of transistor 68 which is therefore held nonconductive. Thus, current mode lamp 84 is not ignited.

Voltage divider 99 is connected between postive voltage source 106 and ground source 108, and applies a positive voltage signal to base 78 of transistor 76 causing it to conduct. Similarly voltage divider 99 applies a positive signal to base 92 of constant current transistor 90 which also conducts. Consequently, current flows from positive, unregulated voltage source 88, through lamp 86, transistor 76, transistor 90, resistor 98, to ground source 108 causing voltage mode indicator lamp 86 to light.

As the load on power supply 10 increases up to the operating or crossover point, sensing resistor 12 applies a signal to base 16 of transistor 14 causing it to conduct and transistor 22 to stop conducting. Accordingly, a more positive signal is applied to anode 46 of diode 44 which is now connected through transistor 14 and resistor 30 to positive voltage source 32. Since cathode 48 of diode 44 is held at a constant voltage by voltage divider 51, diode 44 now becomes less back-biased. However, there is no change in the operation of differential amplifier 67 because diode 44 is not forward-biased. Voltage mode indicator lamp 86 continues to light and transistor 76 continues to conduct, while current mode indicator lamp 84 remains unlighted and transistor 68 remains nonconductive.

When the load on power supply 10 increases sufficiently to cause the current output signal to override the voltage output signal and thus to cause differential amplifier 29 to provide a large enough signal to anode 46 for forward-biasing diode 44, the latter device conducts rendering transistor 58 conductive. Thus, diode 44 senses the overriding of signals and becomes forward-biased. As transistor 58 conducts, a signal is applied to base 70 of transistor 68 which thereupon conducts heavily and causes transistor 76 to cease conducting. Hence, voltage mode indicator lamp 86 stops lighting. Current flows from positive voltage source 88, through current mode indicator lamp 84, through transistors 68 and 90, to ground source 108, and current mode indicator lamp 84 lights. This action continues as long as the power supply current output signal overrides the voltage output signal.

As was mentioned previously, transistor 90 comprises a constant current source which is utilized in order to insure that both lamps 84 and 86 ignite substantially the same brightness. Since base 78 of transistor 76 is connected to voltage divider 99, the same magnitude of signal is constantly applied to base 78; however, the signal applied to base 70 of transistor 68 will vary, depending upon how much diode 44 is forward-biased. Consequently, lamps 84 and 86 would light with different degrees of brightness if constant current source 90 were not used.

Hence this invention includes a differential amplifier having a voltage mode indicator lamp connected to a first transistor and a current mode indicator lamp connected to a second transistor. When the power supply voltage mode is operating, a constant voltage source applies a signal to the first transistor causing it to conduct and the voltage mode indicator lamp to light. Circuit means are provided for sensing that the current mode is not operative and preventing the second transistor from conducting to light the current mode indicator lamp by not allowing a signal to be applied to the second transistor. Even when these means sense operation with current flow, they still prevent the second transistor from conducting so that the voltage mode indicator lamp remains lighted until the current signal overrides the voltage signal. At that time, the circuit means apply a signal to the second transistor causing it to conduct and the current mode indicator lamp to light, while the first transistor stops conducting and the voltage mode indicator lamp turns off. The current mode indicator lamp remains lighted as long as the power supply current output signal overrides the voltage output signal.

It should be appreciated that this inventon is not limited to the specific of the preceding description of one illustrative embodiment. For instance, resistors could be used to replace the lamps of the figure, and they could be connected to external apparatus including relays and lamps.

What is claimed is:

1. A mode indicator circuit for a power supply which is operative in the voltage mode and the current mode, and produces an output current signal and an output voltage signal, comprising:
    a first differential amplifier including first and second transistors, each having first and second electrodes;
    a first source of constant reference potential signals coupled to the first electrode of said first transistor;
    a voltage mode indicator device coupled to the second electrode of said first transistor;
    a current mode indicator device coupled to the second electrode of said second transistor; and
    first means including a diode device coupled to the first electrode of said second transistor and responsive to said power supply output current signal for selectively applying a signal to the first electrode of said second transistor causing said second transistor to conduct and to activate said current mode indicator device when said current signal overrides said voltage signal; and
said first means includes a second means including an amplifying means coupled to said diode device for allowing said device to conduct only when said current signal overrides said voltage signal.

2. The invention according to claim 1 and wherein:
said second means back-biases said diode device only when said current signal underrides said voltage signal and forward-biases said diode device only when said current signal overrides said voltage signal.

3. The invention according to claim 1 and wherein:
said diode device having first and second electrodes; and, second means including an amplifier coupled to said first diode electrode and a second source of constant reference potential signals coupled to said second diode electrode for back-biasing said diode device when said current signal underrides said voltage signal and for forward-biasing said diode device when said current signal overrides said voltage signal.

4. The invention according to claim 1 and wherein:
said diode device having first and second electrodes; a third transistor coupled between the first electrode of said second transistor and the diode device for applying a signal to the first electrode of said second transistor; and, second means coupled to said diode device for allowing said device to conduct only when said current signal overrides said voltage signal.

5. The invention according to claim 1 and wherein:
said voltage mode indicator device includes a lamp for lighting when the first electrode of said second transistor receives no signal; and
said current mode indicator device includes a lamp for lighting when the first electrode of said second transistor receives a signal.

6. The invention according to claim 1 and wherein:
said voltage mode indicator device includes a lamp;
said current mode indicator device includes a lamp;
said first and second transistors each include a third electrode; and
a source of constant current coupled to both said third electrodes for causing both of said lamps to light with substantially the same brightness.

7. The invention according to claim 1 and wherein:
said voltage mode indicator device includes a lamp for lighting when the first electrode of said second transistor receives no signal;
said current mode indicator device includes a lamp for lighting when the first electrode of said second transistor receives a signal; and
said diode device having first and second electrodes; and, second means including a second differential amplifier coupled to said first diode electrode and a second source of constant reference potential signals coupled to said second diode electrode for back-biasing said diode device when said current signal underrides said voltage signal and for forward-biasing said diode device when said current signal overrides said voltage signal.

8. The invention according to claim 1 and wherein:
said first and second transistors each include a third electrode;
said voltage mode indicator device includes a lamp for lighting when the first electrode of said second transistor receives no signal;
said current mode indicator device includes a lamp for lighting when the first electrode of said second transistor receives a signal;
said diode device having first and second electrodes; and, second means including a second differential amplifier coupled to said first diode electrode and a second source of constant reference potential signals coupled to said second diode electrode for back-biasing said diode device when said current signal underrides said voltage signal and for forward-biasing said diode device when said current signal overrides said voltage signal; and
a source of constant current coupled to both said third electrodes for causing both of said lamps to light with substantially the same brightness.

9. The invention according to claim 1 and wherein:
said first and second transistors each include a third electrode;
said voltage mode indicator device includes a lamp for lighting when the first electrode of said second transistor receives no signal;
said current mode indicator device includes a lamp for lighting when the first electrode of said second transistor receives a signal;
said diode device having first and second electrodes, a third transistor coupled between the first electrode of said second transistor and the diode device for applying a signal to the first electrode of said second transistor, and second means including a differential amplifier coupled to said first diode electrode and a second source of constant reference potential signals coupled to said second diode electrode for back-bias said diode device when the current signal underrides the voltage signal and for forward-biasing said diode device when the current signal overrides the voltage signal; and
a source of constant current coupled to both said third electrodes for causing both of said lamps to light with substantially the same brightness.

10. A mode indicator circuit for a power supply which is operative in the voltage mode and the current modes, and produces an output current signal and an output voltage signal, said circuit comprising:
a first differential amplifier including first and second transistors, each having first and second electrodes;
a first source of constant reference potential signals coupled to the first electrode of said first transistor;
a voltage mode indicator device coupled to the second electrode of said first transistor;
a third transistor connected to the first electrode of said second transistor;
a current mode indicator device coupled to the second electrode of said second transistor;
a diode having an anode and a cathode, the cathode being coupled to a second source of constant reference potential signals via a voltage divider and also connected to the third transistor;
a second differential amplifier connected to the anode of said diode, whereby during the voltage mode the second differential amplifier senses that the power supply is not operating in the current mode and back-biases the diode rendering the third transistor cut-off thereby preventing the second transistor from conducting and the current mode indicator device from operating while the voltage divider causes the first transistor to conduct and the voltage mode indicator device operates, but as the load on the power supply increases, the second differential amplifier senses the current output signal and decreases the back-biasing of the diode until the diode becomes forward-biased at which point the current output overrides the voltage output causing the third transistor to conduct which in turn causes the second transistor to conduct and cause the current mode indicator device to operate while the first transistor is cut-off making the voltage mode indicator device inoperative.

11. A circuit as set forth in claim 10 wherein:
said voltage mode indicator device includes a lamp;
said current mode indicator device includes a lamp;
said first and second transistors each include a third electrode; and
a source of constant current coupled to both said third electrodes for causing both of said lamps to light with substantially the same brightness.

References Cited

UNITED STATES PATENTS 3,303,411  2/1967  Gately.
3,383,579  5/1968  Hung _____ 317—33 XR JOHN W. CALDWELL, Primary Examiner DANIEL MYER, Assistant Examiner U.S. Cl. X.R.
323—22